United States Patent [19]

Vockenhuber

[11] 4,290,679
[45] Sep. 22, 1981

[54] CAMERA

[75] Inventor: Peter Vockenhuber, Orges, Switzerland

[73] Assignee: Bolex International SA, Ste-Croix, Switzerland

[21] Appl. No.: 5,736

[22] Filed: Jan. 23, 1979

[30] Foreign Application Priority Data

Jan. 31, 1978 [CH] Switzerland ............... 1035/78

[51] Int. Cl.³ .................. G03B 3/08; G03B 13/18; G03B 17/18
[52] U.S. Cl. ............................ 354/196; 354/198; 354/268; 354/289; 352/170; 352/174; 352/140
[58] Field of Search ............. 354/195–198, 354/289, 268, 199–201; 352/140, 174, 170; 350/187, 184

[56] References Cited

U.S. PATENT DOCUMENTS

| | | | |
|---|---|---|---|
| 3,587,431 | 6/1971 | Holler | 354/289 X |
| 3,605,596 | 9/1971 | Vockenhuber et al. | 354/198 X |
| 3,832,058 | 8/1974 | Gusouius | 354/198 X |
| 4,043,642 | 8/1977 | Hirose et al. | 354/195 X |
| 4,064,520 | 12/1977 | Freudenschuss et al. | 354/196 |
| 4,159,864 | 7/1979 | Yasukuni | 354/196 X |
| 4,161,756 | 7/1979 | Thomas | 352/140 X |

FOREIGN PATENT DOCUMENTS 286776 12/1970 Fed. Rep. of Germany.

Primary Examiner—L. T. Hix
Assistant Examiner—William B. Perkey
Attorney, Agent, or Firm—Martin A. Farber

[57] ABSTRACT

A photographic or cinematographic camera, in particular with a pancratic (zoom) objective lens and a comparator for comparison of the desired setting e.g. of the near point (punctum proximum) and of the far point (punctum remotum) of a camera space and of the actual setting e.g. of the depth of focus, the desired setting being adjusted by means of presetters, the actual setting resulting from the actual setpoints of the objective lens, such as range, diaphragm and under circumstances focal length, the comparator being formed preferably by an electrical linkage device, whereby upon differences between the desired setting and the actual setting, a signal can be released, which signal can be fed to an indicator device, and respectively, or to a control device. A memory device is provided in which all setpoints (which are necessary for a plurality of settings) and/or limit values of objective lens settings are stored in several memory sections which are associated with different desired value ranges. The presetters are connected with a selection device for at least one memory section, whereby that memory section which corresponds to the preset desired value is connectable with a comparator.

4 Claims, 3 Drawing Figures

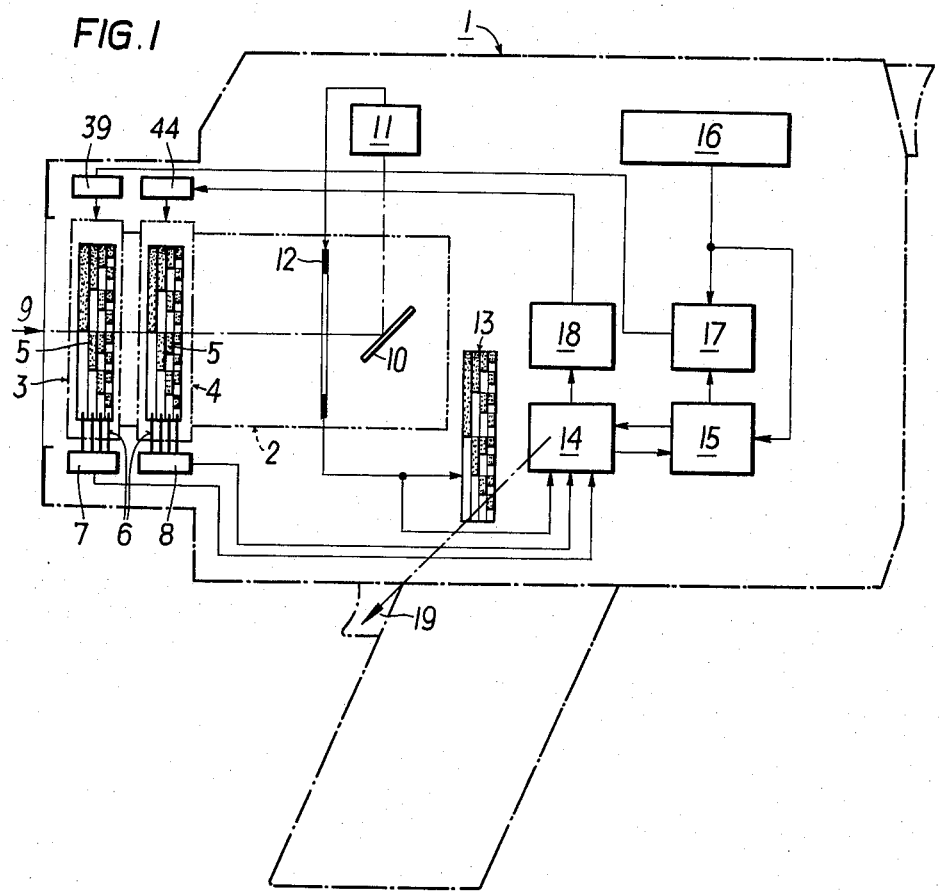
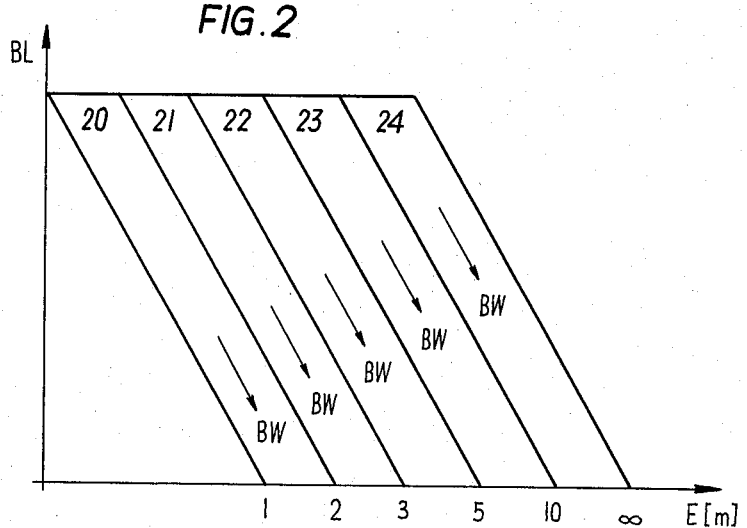

CAMERA

FIELD OF THE INVENTION

The invention relates to a photographic or cinematographic camera, in particular with a pancratic (zoom) objective lens and a comparator for comparison of the desired setting e.g. of the near point (punctum proximum) and of the far point (punctum remotum) of a camera space and of the actual setting e.g. of the depth of focus, the desired setting being adjusted by means of presetters, the actual setting resulting from the actual setpoints or settings of the objective lens, such as range, diaphragm and under circumstances focal length, the comparator being formed preferably by an electrical linkage or coupling device, whereby upon differences between the desired setting and the actual setting, a signal can be released, which signal can be fed to an indicator device, and respectively, or to a control device.

BACKGROUND OF THE INVENTION

Depth of focus (or focal range) computation devices are known, such as for example, as described in Austrian Pat. No. 286.776, which on the basis of the adjustments or settings of the parameters which determine the depth of focus, calculate the value of the depth of focus, and produce a signal upon not reaching of a minimum value (which is defined or determined by means of a presetter) or of a predetermined position.

These type of depth of focus control devices have the disadvantage that the depth of focus must be calculated, which is most extremely expensive and complicated with a mechanical as well as an electronic type of design.

SUMMARY OF THE INVENTION

It is an object of the invention to create a depth of focus control device which avoids the mentioned disadvantages and guarantees a quick access time.

It is another object of the invention to aid the solution of the above-mentioned object in a camera of the introductory-mentioned type by providing, a memory device (35) in which all setpoints (bL, E, Bw) and/or limit values (which are necessary for a plurality of settings) of objective lens settings are stored in several memory sections which are associated with different desired value ranges (20-24), and that the presetters (16) are connected with a selection device (34) for at least one memory section, whereby the memory section which corresponds to the preset desired value is connectable with the comparator (37).

It is another object of the invention to further provide transformers or transducers (31, 32, 33) which execute the conversion of the objective lens setpoints (BL, E, Bw) into electrical measured or read-out values, comprising coded guide tracks (5), the latter being applied on the focussing or adjustment rings of the objective lens, and stationary vanes (6) combing or operatively interengaging the printed conductor lines or tracks.

Further in accordance with the invention, for example, the focal length of the objective lens (2) is determinable by means of a presetter (16), and on the basis of this input, by means of the comparator device (14, 37) the desired positions of the individual lens groups are determinable, and upon deviation of the actual positions from the desired positions, by means of a thereby released signal, a drive device (44) for the axial movement of the lens groups can be triggered and controlled, and whereby the direction of movement of the lenses is contained coded in the signal.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 1 is a schematic view of a camera with transformers or transducers which are necessary for determination of the depth of focus or focal range;

FIG. 2 illustrates the principle of the memory, which illustrates a form conserving the most possible space, and respectively, "bits" of the tabular memory.

SPECIFIC DESCRIPTION

Figure 3:
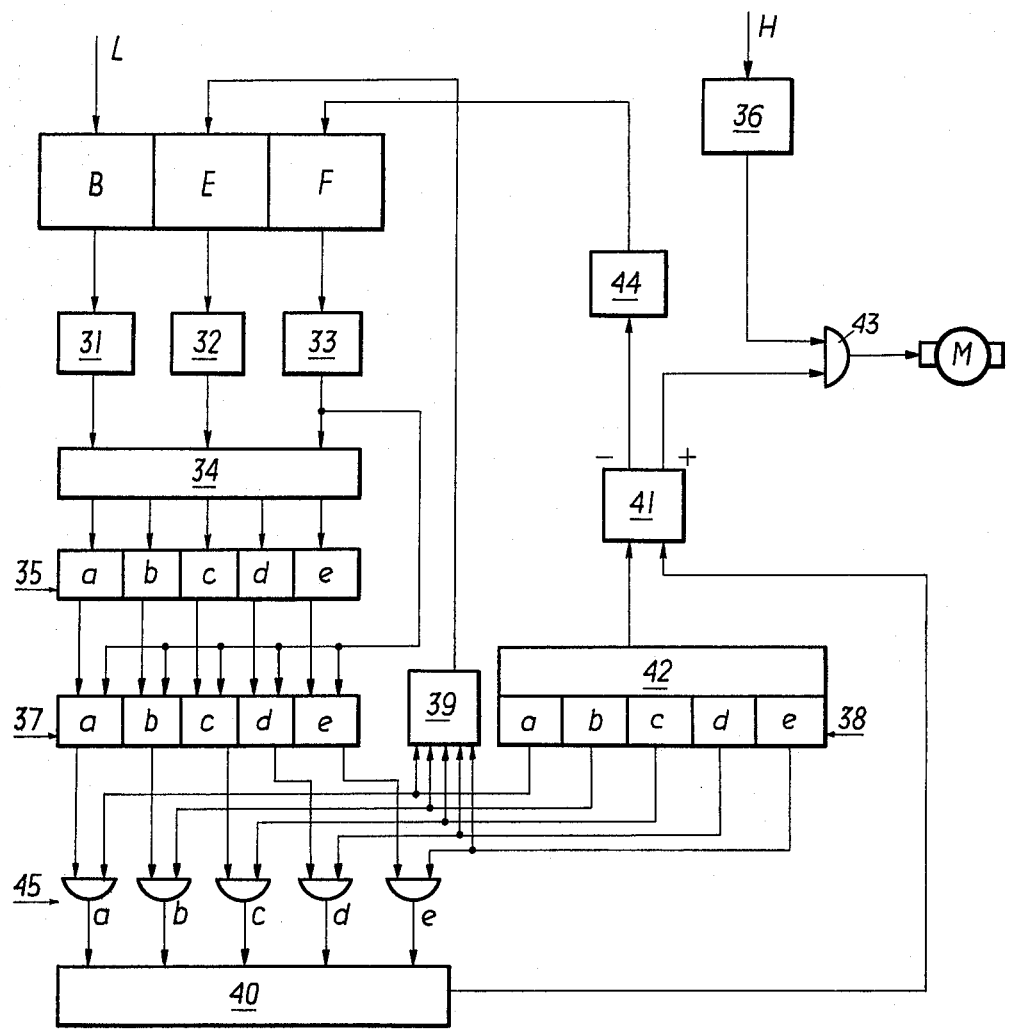
FIG. 3 is a block circuit diagram of the operation course of the camera up to the release.

Referring now to the drawings and more particularly to FIG. 1 which shows a motion picture camera 1 with an objective lens 2 which is made of two focussing or setting adjustment rings 3 and 4 for range (or distance) and focal length. The two focussing or setting rings 3 and 4 carry thereon binary coded guide tracks which are sensed or scanned by stationary vanes 6. Depending upon the position of the setting rings a binary count is produced in the sensing devices 7 and 8.

The light 9 which falls through the objective lens is thrown by a reflecting mirror 10 onto a photometric control device 11 which controls the setting or adjustment of the diaphragm 12.

The position of the diaphragm is also binary coded by an additional sensing device 13 and together with the two other setpoints from the setting rings 3, 4 is fed to a comparison device (comparator) 14 where they are compared with stored values from a memory.

An input device 16 serves for the manual setting of the desired depth of focus range (also called depth of field), which communicates with the memory 15, whereupon in the latter (as explained in more detail with respect to FIG. 2) all those partial regions are activated which fall in the desired depth of focus range.

Simultaneously automatically the distance setting or focussing of the objective lens is set and positioned in the center of the preselected depth of focus range by means of a control device 17 and a drive 39.

The memory 15 is connected to and from the comparator 14.

If the values which are compared in the compartor device 14 correspond, then the film transport movement is released or started (as indicated by the arrow 19). If the measured or read out values do not agree or correspond with the desired values, then via a control device 18 and a drive 44, for example, the focal length of the objective lens is shortened. Likewise it would be possible to lengthen the exposure time period or shutter speed, whereby the diaphragm would be additionally controlled, which likewise would produce an increase of the depth of focus.

Since too large a depth of focus is not disturbing or is disturbing only in certain cases, accordingly the camera is rated or designed such that only with too small an actual depth of focus, does a focul length control take place. It thereby is left to the user of the camera to increase the focal length by hand or by motor until the actual depth of focus becomes smaller than the set range, whereby then however a blocking of the release or trigger device takes place, and the focal length is controlled smaller until the depth of focus corresponds to the preselected value.

FIG. 2 schematically shows the form of a tabulation of the desired values of the settings or focusing of the objective lens.

In this manner the diaphragms Bl, and distances E (1 m ... ∞) are two variable parameters which are given by the photometry, and respectively, the presetters (16, FIG. 1).

By the preselection of the range (and respectively its determination after preselection of the depth of focus range) one of the ranges 20–24 is selected. The f-number or stop value then yields the ordinate under which ordinate then the corresponding focal length Bw is to be found. In this manner a three dimensional problem is reduced to a two dimensional one, since all values which exceed the preselected conditions (in this case thus producing a larger depth of focus) need not be stored. With mechanical storage this permits a great simplification of the moveable parts, and with electronic storage this permits substantial reduction of the storage or memory space that is needed.

If by means of the presetter or preadjuster 16 two partial ranges are preselected, then the distance or range at the center of the aggregate sum range is set, whereupon likewise the described process proceeds.

FIG. 3 shows a possible embodiment form of the control course for the setting of the desired depth of focus. The adjustment or setting of an objective lens (which objective lens includes a means for the distance adjustment or setting E, for the focal length setting F and a diaphragm B, the latter being controlled corresponding to the incident light L) is sensed by three transducers or transformers 31, 32, 33 for the diaphragm B, range (or distance) E and focal length, respectively. These transformers send their measured or read out values to a control device 34 in the form of binary numbers. The binary numbers of the range adjustment or setting and of the diaphragm are processed to an interrogation command or instruction for a certain address for a memory 35, in which address the limit value for the focal length is stored.

By pressing the release or trigger 38 (illustrated by the arrow H) an interrogation command is sent from the data linkage coupling device 34 to the memory 35, which memory thereupon further conducts the desired limit value straight to a comparator device 37. A second output of the transducer 33 for the focal length setting or adjustment likewise leads to the comparator 37. The comparator 37 and the memory 35 are subdivided into several partial sections (a–e) corresponding to preselected depth of focus ranges. If one of these partial sections is selected, thus for example in the section 37c, the limit value of the focal length, which limit value is interrogated by the memory section 35c, is compared with the actual value of the focal length setting, which actual value comes from the transducer 33. If the actual value is smaller or the same as the stored limit value, then at the output of the section 37c there appears a logic plus, and if it is larger there appears a logic minus.

The input device 38 likewise has sections a–e, which correspond to a series of depth of focus ranges. They are preselectable by pressing push buttons (not illustrated) and advantageously overlap in order to avoid error with adjustments or settings in limit ranges.

A distance or range adjustment or setting device 39 is connected to the input device. The range adjustment device 39 adjusts or sets the range respectively under the circumstances to the center of the preselected entire range.

The sections of the input device 38 have outputs which stand in the preselected condition of the respectively prevailing section at logic plus, otherwise at minus.

Each of these outputs together with the output of the corresponding section of the comparator device 37 feeds one of the AND gates 45 (a–e), the output of which gate then is at plus only when both inputs are at plus.

A counter 40 is connected to the outputs of the AND gates 45. In the counter device 40, the number of the gate outputs which stand at plus is counted, and the aggregate or summation signal is sent to a comparator device 41, to which summation signal, as a comparison signal there is available another summation signal which is determined by means of another counter 42, which latter-mentioned summation signal corresponds to the number of the preselected ranges of the input device 38.

If these two summation signals correspond or agree, then via the + output of the comparator 41 a logic plus is fed to an AND gate 43; simultaneously with the pressed release or trigger device 36 likewise a plus potential is sent to the second input of the AND gate 43, so that this potential places the motor in operation, which for example can occur via a relay (not illustrated).

If the summation signals do not correspond, this means that at least one section of the comparator device 37 is fed with non-corresponding values. In this case the focal length must be reduced, which is caused via the − output of the comparator 41, which comparator 41 activates a drive device 44 for those members of the objective lens which members produce a focal length variation. As soon as the required focal length is reached the camera is then released or started.

The invention is not limited to the described or illustrated embodiment example; it is also possible, without anything more being required, to store, for example, a coordination or association of lens positions for different focal lengths, and on the basis of the adjustment or focusing for example of the variator of a pancratic (zoom) lens, to interrogate the position or setting of the compensator from the memory and to adjust it by means of adjusting or setting devices.

Also directly for example the focal length could be predetermined or preset, whereupon then all lens adjustments or settings are interrogated and are controlled.

Further the invention is not limited to control of the objective lens, but rather for example can be used even to control the exposure time in the "long time" operation, whereby on the basis of a certain lightness value, the exposure time, which is stored as a function of the lightness, is adjusted.

While I have disclosed several embodiments of the invention it is to be understood that these embodiments are given by example only and not in a limiting sense.

I claim:

1. In a photographic or cinematographic camera, in particular with a pancratic (zoom) objective lens and a comparator for comparison of the desired setting e.g. of the near point (punctum proximum) and of the far point (punctum remotum) of a camera space and of the actual setting e.g. of the depth of field, the desired setting being adjusted by means of presetters, the actual setting resulting from the actual setpoints of the objective lens, such as distance, diaphragm and under circumstances focal length, whereby upon differences between the desired setting and the actual setting, a signal can be released, which signal can be fed to an indicator device, and respectively, or to a control device, the improvement comprising a comparator operatively connected to the objective lens so as to receive a first input representative of an actual value of a parameter of the actual setting of the objective lens, a memory means including several memory sections each connected to said comparator, selection means connected to said memory means for transfering inputs representative of values of the actual settings of the objective lens and of the diaphragm to each of said memory sections, said several memory sections having tabular-like fixed storage of all setpoints which are necessary for a plurality of settings and/or limit values of objective lens settings including corresponding fixed stored precalculated values of said parameter in said several memory sections, the several memory sections each being associated with different ranges of desired values of the depth of field, said memory means for being available for sending signals from each of said memory sections respectively to said comparator, said signals being representative of the stored precalculated values of said parameter, corresponding to said different ranges, for the actual setting of the objective lens and of the diaphragm, said comparator constitutes means for comparing said signals with said first input and for providing outputs respectively representing the comparisons, means comprising presetters representing desired values of the depth of field and for operatively selecting a desired depth of field value and for operatively selecting said signals of a corresponding of said memory sections and said outputs of said comparator representing the comparison of the latter mentioned said signals with said actual value of said parameter for providing an evaluation signal for a necessary readjustment of said parameter and said objective lens when said latter mentioned said signals and said first input are not equivalent.

2. The camera as set forth in claim 1, further comprising means including transducers for converting the actual setting of the objective lens into electrical measured values and sending same to said selection means, and further comprising adjustment rings constituting means for adjusting the objective lens, said transducers comprise, coded tracks applied on said adjustment rings, and stationary vanes operatively reading said coded tracks and connected to said selection means and said comparator, respectively.

3. The camera as set forth in claim 1, wherein said evaluation signal comprises a parameter input for the objective lens compatable with the selected said desired depth of field value and said actual settings of the diaphragm and of the objective lens other than said first input, said parameter input constituting the readjustment of said first input of said parameter of the actual setting of the objective lens, drive means for axially moving lens groups of the objective lens, comparator means including said comparator is operatively connected to said drive means and is for determining desired positions of individual of the lens groups on the basis of said parameter input and upon deviation of actual positions from the desired positions for releasing a signal for controlling said drive means, a direction for movement of the lens groups being coded in said last-mentioned signal.

4. The camera as set forth in claim 3, wherein said parameter input is the focal length.

* * * * *